Patented Aug. 3, 1926.

1,594,417

UNITED STATES PATENT OFFICE.

WILLIAM HOFFMAN KOBBE, OF NEW YORK, N. Y., ASSIGNOR TO TEXAS GULF SULPHUR COMPANY, OF BAY CITY, TEXAS, A CORPORATION OF TEXAS.

METHOD OF IMPROVING THE PROPERTIES OF ARTICLES FORMED OF FIBROUS MATERIALS WITH CEMENT BINDING AGENTS.

No Drawing.   Application filed May 22, 1924.   Serial No. 715,059.

This invention relates to articles which are composed in large part of fibrous materials, and has for its object the provision of a method of improving the properties, more especially of articles formed of fibrous materials in which a binding agent of cement is employed.

Throughout this specification and appended claims the term "cement" is used to mean a calcareous compound and does not refer to minor adhesives of the class typified by glue. The term, however, is intended to include other cements of the Portland cement class, such, for example, as Roman cement, the so-called hydraulic cements, cements made from blast furnace slag, etc.

Many articles used in the industrial arts are composed principally of a fibrous material and a binding agent of cement. Articles made of various fibrous materials and cement are within the scope of treatment of my invention. Thus, products or articles composed in large part of asbestos fibre, asbestos cloth, or asbestos board, fibrous talc, cocoanut fibre, waste cotton, etc., or an appropriate mixture of these materials, in which cement is used as a binding agent, may be made and then treated according to my invention to give to them qualities greatly superior to the untreated products or articles. As one specific example of a product to which greatly improved properties may be added by the practice of my invention may be mentioned composition board made of asbestos and Portland cement.

The use of articles of the class just described is restricted to a rather marked degree because of certain physical characteristics of these articles, such as deficiency of strength, brittleness, or friability, ability to absorb water, in some cases their inflammability, and inability to withstand the action of chemicals.

The present invention contemplates a method of improving the properties of articles or products made of fibrous materials in which cement is used as a binding agent to render them better suited for the uses for which they are now ordinarily employed, and, moreover, to adapt them for uses for which they have been heretofore unsuitable.

Articles or products of fibrous materials as above referred to, when treated in accordance with the present invention, are impervious, non-absorptive of moisture, and extremely resistant to acids and corrosive liquors, and other chemicals. They possess relatively high dielectric strength and in many cases are rendered non-inflammable. Perhaps, however, the most remarkable properties imparted to the articles as a result of the treatment are resiliency or elasticity, toughness, and a marked increase in both tensile and compressive strengths. The invention also contemplates an improved fibrous product and fibrous composition.

In carrying out the invention, which involves the improvement in these products by imparting to them the improved properties just mentioned, the pores or interstices of the fibrous material and of the cement binding agent are filled or impregnated with sulfur which is allowed to congeal therein to form a resilient, tough, strong, and impervious mass. The resiliency, toughness, and strength imparted to the product is particularly remarkable because of the fact that the untreated fibrous product is not resilient, has relatively low tensile strength, and is relatively brittle. Neither does sulfur by itself possess any of these properties, and in particular it is relatively weak and extremely brittle. Nevertheless, I have discovered that when the pores or interstices of such a fibrous articles as mentioned above are impregnated with congealed sulfur, both the tensile and compressive strengths of the resulting product are increased from five to ten times, and the product is so resilient and tough that, even in relatively slender formations, it may be dropped upon a hard floor without fracturing and, in fact, will rebound to a considerable height after the impact. By congealed sulfur I mean sulfur which has solidified or congealed in situ in the interstices of the article, the sulfur being initially introduced in a liquid or molten condition into the interstices. Although I am unable to explain the remarkable increase in resiliency, toughness, and strength, and do not wish to be limited to any particular theory or explanation of the results obtained, it appears to me that there is some chemical action between the molten sulfur and the cement, possibly resulting in the formation of certain sulfo-silicates.

Various methods may be employed for impregnating articles of the class covered by this invention with sulfur. It is usually sufficient, particularly with small objects of fibrous material and cement, to introduce them, either with or without preheating, into a bath of molten sulphur at a temperature of about 120°C. at which temperature the sulphur is a relatively thin mobile liquid. The fibrous articles should be completely submerged in the bath and, if necessary, means should be provided for holding them below the surface of the molten sulfur.

In order to secure a most satisfactory impregnation of the article with sulfur, the pores or interstices of the articles must be freed of gases to permit the filling of the pores with sulfur. This may be accomplished by increasing the temperature of the bath until it approaches the viscous stage, which is in the neighborhood of 220° C. This causes the heat of the bath to penetrate well into the articles and completely expel air or other gases from the pores, both of the fibrous material itself and of the cement binding agent. After the gases have been thoroughly expelled, the temperature of the bath is lowered until the sulfur again reaches the thin liquid stage; the gases now having been removed from the pores, the sulfur in the thin mobile condition will more easily enter and fill the pores of the material.

In practice, the time required for effecting the desired impregnation varies from a few minutes to several hours, or even days, depending upon the extent of impregnation desired. In order to secure the maximum increase in strength, it is preferable that the impregnation should be complete, that is, it should extend substantially throughout the entire mass of the article. If only increased resiliency and external toughness and imperviousness are desired, and the maximum increase in strength is not so important, the impregnation may be carried to the proper depth to secure the results desired, and the length of time, temperature of bath, and other factors necessary to secure these results, can be determined by investigation. Substantially complete impregnation of the articles will generally be obtained, however, within from twelve to twenty-four hours, depending upon the size and shape of the object being impregnated. During the soaking period it may be found advantageous to raise the temperature of the bath temporarily, as this seems to aid in securing a good impregnation.

When particularly complete impregnation is desired, great care should be exercised in withdrawing the article from the bath in order to insure that a negligible or unobjectionable quantity of sulfur will thereafter flow out from the interstices before solidifying. To this end it is generally of advantage to withdraw the impregnated article from the bath of molten sulfur at as low a temperature as practicable. The bath and the object being impregnated should both be allowed to cool until the sulfur begins to show indications of congealing upon the surface of the object when the surface is lifted from contact with the bath. Then the article is slowly withdrawn from the bath and the melting or vaporization of the sulfur, which is upon or near the surface of the object, by the heat contained in the object itself, is prevented and the sulfur on the surface of the object begins to congeal during the withdrawing operation. Thus, the sulfur congealing on the surface of the object seals within it substantially all of the sulfur which has been received into the interstices from the molten sulfur bath.

In the practice of the invention I have imparted greatly improved properties to articles made of fibrous talc, cocoanut fibre, and waste cotton, in which cement was used as the binding agent for the fibrous material, and particularly to articles made of asbestos fibre, asbestos cloth, and asbestos board, using Portland cement as the binding agent. Asbestos board is a composition board which is made from short fibre asbestos and a binding agent of Portland cement, usually with the application of pressure. The quantity of Portland cement used may be varied within rather wide limits, but ordinarily such composition board contains from 25 to 50% of cement. At present this material finds a rather limited use as it is especially absorbent of water, brittle, and does not have a particularly high tensile strength.

I have secured particularly remarkable results, however, in treating in accordance with this invention such composition board. My investigations have shown that this composition board, after immersion for about twenty minutes in a molten sulfur bath, absorb 24% by weight of sulfur. A piece of this product two inches wide, three inches long, and one-quarter of an inch thick, and weighing sixty-two grams, was dropped from a height of eight feet onto a hard rigid tile floor without shattering, and with a rebound of from six to eight inches after impact with the tile floor. The resiliency and toughness indicated by this test is quite in contrast to the same properties possessed by the untreated composition board. I have also conducted tests, both of the tensile and compressive strengths of composition board comprising asbestos and Portland cement completely impregnated with congealed sulfur, which indicate that the sulfur-impregnated composition board is from five to ten times stronger than the unimpregnated composition board.

My investigations of the impervious properties of this material showed a correspondingly great difference in this characteristic between the treated and untreated board. A piece of composition board completely impregnated with congealed sulfur was immersed in water for forty-eight hours. This test piece originally weighed 245 gms., but showed no gain in weight whatever during the period of soaking in water. In order to increase the severity of the test, the water was raised to the boiling point periodically and was maintained at the boiling point for a total of seven hours out of the forty-eight hour test period. In comparison, an untreated piece of the same composition board, and weighing 180 gms. was immersed in water for a period of twelve hours during which time it increased 25 gms. in weight.

The improved physical and chemical properties imparted to articles made of fibrous material and cement treated in accordance with the invention render them more suitable for the uses for which they have heretofore been employed, and open up a large field of utility in which they have formerly been entirely unadapted for use. The increased resiliency, toughness, strength, and imperviousness, and their ability to withstand chemical action makes these new articles or products adaptable for use in the manufacture of mixing floors, baseboards, laundry tubs, table tops, counter tops, billiard tables, bowling alleys, and a variety of other similar applications. Moreover, such materials are suited for applications below ground, such as in the composition of conduit pipe; and in the chemical field the material may be used to advantage in the manufacture of chemical hoods, and walls resistant to acid fumes.

I claim:

1. The method of improving the properties of an article of fibrous material containing cement as a binding agent which comprises impregnating said article either wholly or in part with sulfur.

2. The method of improving the properties of an article of fibrous material containing Portland cement as a binding agent which comprises impregnating said article either wholly or in part with sulfur.

3. A tough, resilient, and non-friable composition formed of a fibrous material and a binding agent of cement, and impregnated with congealed sulfur.

4. A tough, resilient, and non-friable composition formed of a fibrous material and a binding agent of Portland cement, and impregnated with congealed sulfur.

5. A tough, resilient, and non-friable composition formed of asbestos and a binding agent of Portland cement and impregnated with congealed sulfur.

6. An article of asbestos containing a binding agent of cement and impregnated with congealed sulfur.

7. An article of manufacture comprising from 25 to 50% by weight of cement and the remainder asbestos fibre and impregnated with congealed sulfur.

8. A composition board comprising from 25 to 50% by weight of Portland cement and the remainder asbestos fibre and impregnated with congealed sulfur.

In testimony whereof I affix my signature.

WILLIAM HOFFMAN KOBBÉ.